United States Patent
Hall et al.

(10) Patent No.: US 11,142,176 B2
(45) Date of Patent: Oct. 12, 2021

(54) ELECTRIC VEHICLE WITH ANTILOCK BRAKING SYSTEM

(71) Applicant: HALL LABS LLC, Provo, UT (US)

(72) Inventors: David R. Hall, Provo, UT (US);
Stephen Hall, Draper, UT (US);
Chistopher Johnson, Provo, UT (US)

(73) Assignee: Vanderhall Motor Works, Inc., Provo, UT (US)

(*) Notice: Subject to any disclaimer, the term of this patent is extended or adjusted under 35 U.S.C. 154(b) by 319 days.

(21) Appl. No.: 16/226,883

(22) Filed: Dec. 20, 2018

(65) Prior Publication Data

US 2020/0198606 A1 Jun. 25, 2020

(51) Int. Cl.
| | |
|---|---|
| *B60T 8/1761* | (2006.01) |
| *B60T 8/171* | (2006.01) |
| *B60L 15/20* | (2006.01) |
| *B62D 61/06* | (2006.01) |
| *B60L 3/00* | (2019.01) |

(52) U.S. Cl.
CPC .......... *B60T 8/17616* (2013.01); *B60T 8/171* (2013.01); *B60L 15/20* (2013.01); *B60T 2270/10* (2013.01); *B60Y 2200/91* (2013.01); *B60Y 2400/81* (2013.01); *B62D 61/065* (2013.01)

(58) Field of Classification Search
CPC .. B60T 8/17616; B60T 8/171; B60T 2270/10; B60Y 2400/81; B60Y 2200/91; B60L 15/20; B60L 3/0076; B60L 15/2009; B60L 2240/421; B60L 2220/42; B60L 2220/44; B62D 61/065
See application file for complete search history.

(56) References Cited

U.S. PATENT DOCUMENTS

| | | | | |
|---|---|---|---|---|
| 5,163,170 | A | * | 11/1992 | Grabowski ............... B60L 3/00 318/113 |
| 7,469,533 | B2 | * | 12/2008 | Dawson ................ F01N 3/0238 60/295 |
| 9,139,177 | B1 | * | 9/2015 | Bolenbaugh ............ B60T 8/267 |
| 2005/0189887 | A1 | * | 9/2005 | Donnelly ................. B60L 3/102 318/52 |
| 2012/0116619 | A1 | * | 5/2012 | Tate ........................ B60L 50/61 701/22 |
| 2012/0253614 | A1 | * | 10/2012 | Hiroya ................. B60K 17/344 701/51 |
| 2013/0281247 | A1 | * | 10/2013 | Holmes .................... B60K 6/52 475/150 |

(Continued)

*Primary Examiner* — Frederick M Brushaber
(74) *Attorney, Agent, or Firm* — Jeff Duncan; Jedi Knight

(57) ABSTRACT

An antilock brake system is disclosed comprising a first wheel and second wheel disposed on opposite sides of a vehicle. A first electric motor providing torque to the first wheel and a second electric motor providing torque to the second wheel. A sensor monitoring each wheel and a brake on each wheel. A system is described wherein a processor monitors signals from the sensors and increases torque to either wheel when it detects that the wheel is not rotating when another wheel is rotating. Also disclosed is an antilock brake system as above with a third wheel disposed on the rear of the vehicle also comprising a sensor and brake on the third wheel and wherein the processor monitors signals from the sensors to increase torque to either front wheels when it detects that the wheel is not rotating when another wheel is rotating.

20 Claims, 5 Drawing Sheets

(56) References Cited

U.S. PATENT DOCUMENTS

| | | | |
|---|---|---|---|
| 2015/0224970 A1* | 8/2015 | Yasui | B60T 8/172 |
| | | | 701/74 |
| 2016/0375944 A1* | 12/2016 | Kunsch | B60N 2/01 |
| | | | 180/211 |
| 2017/0253234 A1* | 9/2017 | Obitsu | B60L 3/08 |
| 2018/0099675 A1* | 4/2018 | Boisvert | B60L 15/2054 |
| 2018/0141441 A1* | 5/2018 | Kim | B60L 58/13 |
| 2018/0222322 A1* | 8/2018 | Shimizu | B60L 15/007 |
| 2019/0381895 A1* | 12/2019 | Shindo | B60W 10/08 |

* cited by examiner

ELECTRIC VEHICLE WITH ANTILOCK BRAKING SYSTEM

TECHNICAL FIELD

This invention relates to electric vehicles and antilock brakes.

BACKGROUND

Advances in electric motors and battery power have put many electric vehicles on the road. These advances have allowed these vehicles increased speed and performance. Nevertheless, advances in brake systems have lagged behind. For example, most antilock brakes still rely on a method of quickly engaging and disengaging the brakes to prevent skidding and allowing a driver control of the vehicle while coming to a stop.

SUMMARY

In a first aspect, the disclosure provides an electric vehicle with an antilock braking system for an electric vehicle. The vehicle includes: a first wheel on a first side of the vehicle, driven by a first motor; a second wheel on a second, opposite side of the vehicle, driven by a second motor; a first sensor adapted to detect rotational speed of the first wheel, a second sensor adapted to detect rotational speed of the second wheel, a processor adapted to increase torque delivered to the first wheel from the first motor when the first sensor detects the first wheel has stopped rotating while the second wheel is still rotating, or to increase torque delivered to the second wheel from the second motor when the second sensor detects the second wheel has stopped rotating while the first wheel is still rotating, and wherein each wheel has a brake.

In a second aspect, the disclosure provides an antilock braking system for an electric vehicle comprising: a first wheel on a first side of the vehicle, driven by a first motor; a second wheel on a second, opposite side of the vehicle, driven by a second motor; a third wheel on a third side of the vehicle opposite the first two wheels; a first sensor adapted to detect rotational speed of the first wheel, a second sensor adapted to detect rotational speed of the second wheel, a third sensor adapted to detect rotational speed of the third wheel, a processor adapted to increase torque delivered to the first wheel from the first motor when the first sensor detects the first wheel has stopped rotating while the third wheel is still rotating, or to increase torque delivered to the second wheel from the second motor when the second sensor detects the second wheel has stopped rotating while the third wheel is still rotating, and wherein each wheel has a brake Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, antilock brake is meant to refer to a system for improving traction to tires on a surface while a vehicle is braking allowing a driver to maintain control of the vehicle while braking.

The invention has been described with reference to various specific and preferred embodiments and techniques. Nevertheless, it is understood that many variations and modifications may be made while remaining within the spirit and scope of the invention.

Figure 1:
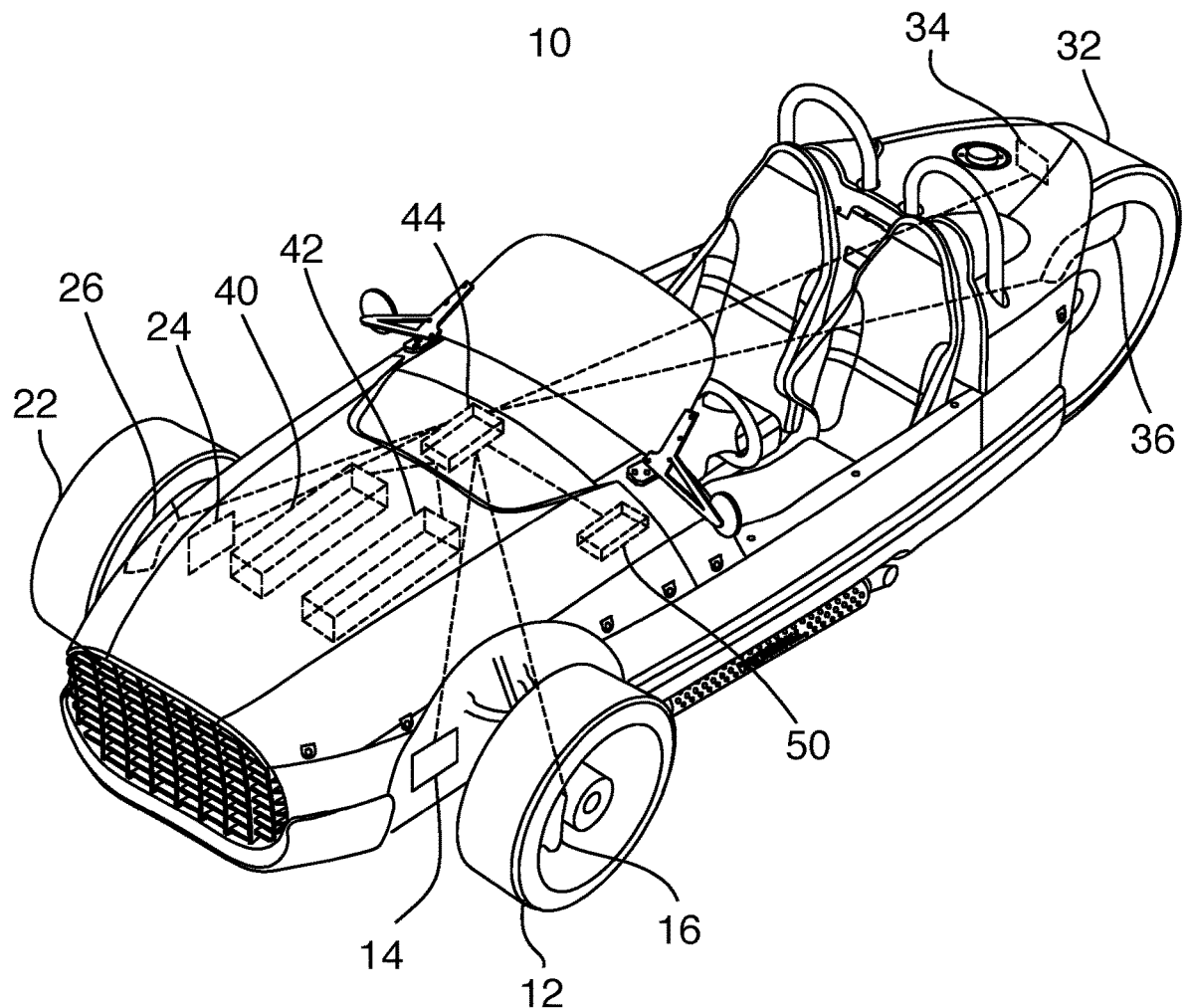
FIG. 1 is a three wheeled vehicle with an antilock brake

FIG. 1 shows an embodiment of an electric vehicle 10 utilizing an antilock braking system. The antilock braking system consists of a first wheel 12 with a sensor 14 and a brake 16. It also consists of a second wheel 22 with a sensor 24 and a brake 26. And a third wheel 32 with a sensor 34 and a brake 36. The vehicle contains a first electric motor 40 and a second electric motor 42. A processor 44 communicates to each sensor and motor. Preferably the vehicle contains a brake activation device 50 disposed on the floor of the vehicle acting as a pedal which the driver may push with their foot. The brake may also be activated anywhere within the vehicle that may be reached by the driver and may be one or more pedals, switches, buttons, toggles, levers or other mechanisms which may be activated by the driver. When activated the processor sends a signal to the brakes 16, 26 and 36 and activates the brakes to bring the vehicle to a stop.

The processor 44 may send a signal to the first electric motor 40 to increase torque to the first wheel 12 until the rotation of the first wheel is equal to the rotation of the second wheel 22. The processor 44 may also send a signal to the second electric motor 42 to increase torque to the second wheel 22 until the rotation of the second wheel is equal to the rotation of the first wheel 12. The processor may also send a signal to the first electric motor 40 to increase the torque to the first wheel 12 until the rotation of the first wheel is equal to the rotation of the third wheel.

The processor 44 may send a signal to the first electric motor 40 to increase torque to the first wheel 12 until the rotation of the first wheel is a percentage of the rotation of the second wheel 22. The processor may send a signal to the second electric motor 42 to increase the torque to the second wheel 22 until the rotation of the second wheel is a percentage of the rotation of the first wheel 12. The processor may also send a signal to the first electric motor 40 to increase torque to the first wheel 12 until the rotation of the first wheel is a percentage of the rotation of the third wheel 32. The processor may also send a signal to the second electric motor 42 to increase torque to the second wheel 22 until the rotation of the second wheel is a percentage of the rotation of the third wheel 32. The processor may send a signal to the first motor 40 to increase torque to the first wheel 12 until the rotation of the first wheel is a predetermined rate of rotation. The processor may also send a signal to the second electric motor 42 to increase torque to the second wheel 22 until the rotation of the second wheel is a predetermined rate of rotation.

Figure 2:
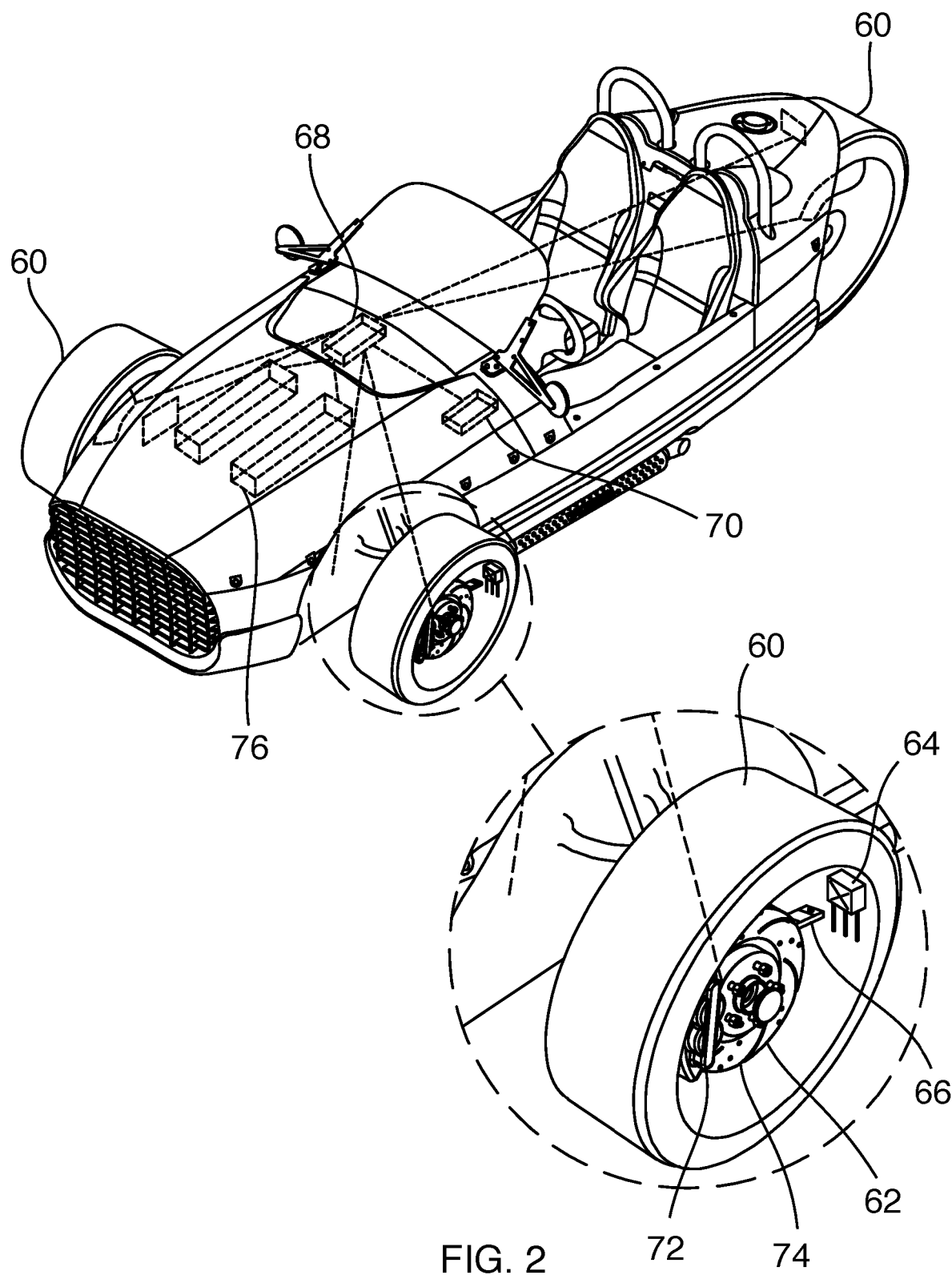
FIG. 2 is a wheel with a brake and sensor.

FIG. 2 shows a wheel 60 with a brake 62 and sensor 64. The sensor shown is a Hall effect sensor, but other sensors may be used such as a frequency sensor or optical sensor. The Hall effect sensor detects rotational motion of the wheel by detecting changes of the magnetic field of a magnet 66 within the wheel and sends rotational data to the processor. Alternatively, a rotating metal disc can be used with a Hall effect sensor, i.e. a transducer that varies its output voltage in response to one or more magnets on the wheel passing by it. A processor 68 receives rotating motion data of each wheel 60 from the Hall effect sensor 64 and monitors the rotational speed of each wheel 60 continuously.

When a brake activation device 70 is activated by the driver it sends a signal to the processor 68 to activate the brakes 62 on each wheel. The brakes shown are disc brakes. However other brakes may be used such as drum brakes, mechanical emergency brakes, or other types of brakes. When the signal from the processor 68 is received by the brakes it activates brake pads 72 to press against the disc brake rotor 74 slowing the speed of the wheel. When the processor 68 receives rotational motion data from the Hall effects sensor 64 for a wheel which is not rotating while other wheels are still rotating it may send a signal to one of the vehicle's electric motors 76 to increase torque to the wheel. The motor may increase the torque to the wheel by generating more torque. When the torque of a wheel 60 exceeds an amount necessary to overcome the frictional force of a road surface the wheel will begin to rotate again. The Hall effect sensor 64 will send signals to the processor 68 that the wheel 60 is rotating again. When the processor 68 receives a signal from the Hall effect sensor 66 that the wheel 60 is rotating again it sends a signal to one of the vehicle's electric motors 76 to stop increasing torque to the wheel 60. The electric motor 76 may then decrease the torque to the wheel 60 by generating less torque.

The rate the wheel needs to rotate at may be determined as the rate at which the fastest wheel of the vehicle is rotating. The rate the wheel needs to rotate at may also be determined as the rate at which another wheel of the vehicle is rotating. The rate the wheel needs to rotate at may be determined as a percentage of the total rate at which the fastest wheel of the vehicle is rotating. The rate the wheel needs to rotate at may be determined as a percentage of the total rate at which another wheel of the vehicle is rotating. The rate of rotation may further also be a predetermined rate which is determined by the manufacturer of the vehicle.

Figure 3:
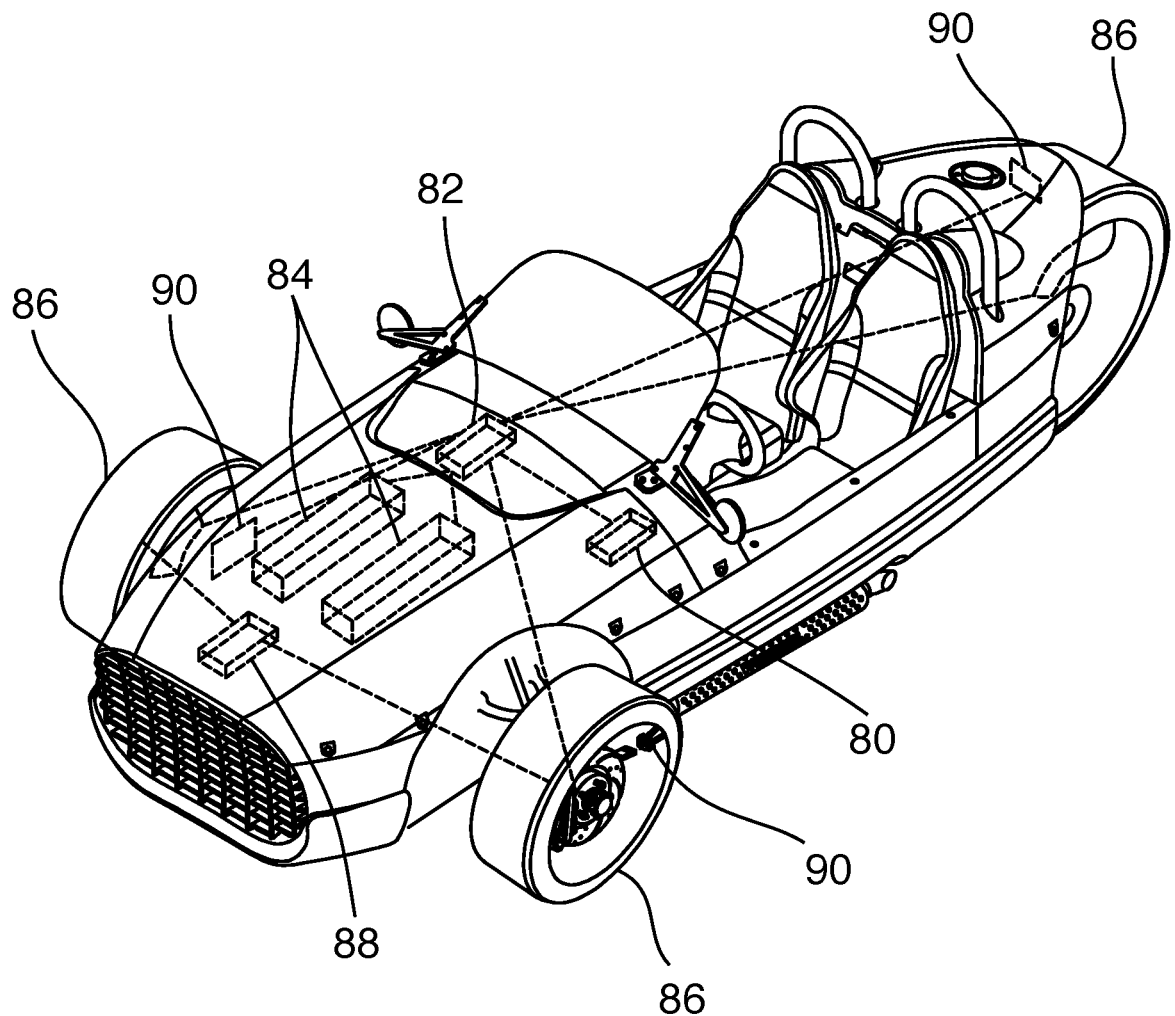
FIG. 3 is a vehicle with regenerative brakes.

The vehicle antilock brake system may be part of a regenerative braking system. FIG. 3 shows a vehicle with a regenerative braking system. Preferably, the regenerative braking engages automatically when the driver engages the brake pedal. Alternatively, the driver of the vehicle may activate the regenerative brake by a regenerative braking activation device 80. The regenerative braking activation device may be a pedal activated by driver or any type of button, switch, lever, touchscreen, remote device or any other type of activation device. When the driver activates the regenerative brake system a signal is sent to a processor 82. The processor 82 sends a signal to one or more electric motors 84 to begin generating power. Power is generated from the rotational energy of one or more wheels 86 to be stored in at least one battery 88 within the vehicle. When power is generated from the rotational energy of the wheels the vehicle is slowed.

As the vehicle slows an optical sensor 90 monitors the rotational speed of each wheel 86. Optical sensors are shown however other sensors may also be used such as a Hall effect sensor, a frequency sensor or laser sensor. When the processor 82 receives rotational motion data from a sensor 90 for a wheel which is not rotating while other wheels are still rotating it may send a signal to one of the vehicles electric motors 84 to increase torque to the wheel which is not rotating. The electric motor 84 may stop generating power and increase the torque to the wheel by generating torque. When the torque of the wheel exceeds an amount necessary to overcome the frictional force of a road surface the wheel will begin to rotate again. The optical sensor 90 is shown that will send a signal to the processor 82 that the wheel is rotating again. When the processor receives a signal from the optical sensor 90 that the wheel is rotating again it sends a signal to one of the vehicle's electric motors 84 to stop increasing torque to the wheel. The electric motor may then decrease the torque to the wheel by generating less torque.

The rate the wheel needs to rotate at may be determined as the rate at which the fastest wheel of the vehicle is rotating. The rate the wheel needs to rotate at may also be determined as the rate at which another wheel of the vehicle is rotating. The rate the wheel needs to rotate at may be determined as a percentage of the total rate at which the fastest wheel of the vehicle is rotating. The rate the wheel needs to rotate at may be determined as a percentage of the total rate at which another wheel of the vehicle is rotating. The rate of rotation may further also be a predetermined rate which is determined by the manufacturer of the vehicle. Preferably, the percentage is at least 75%, more preferably at least 85% and most preferably at least 90%.

Figure 4:
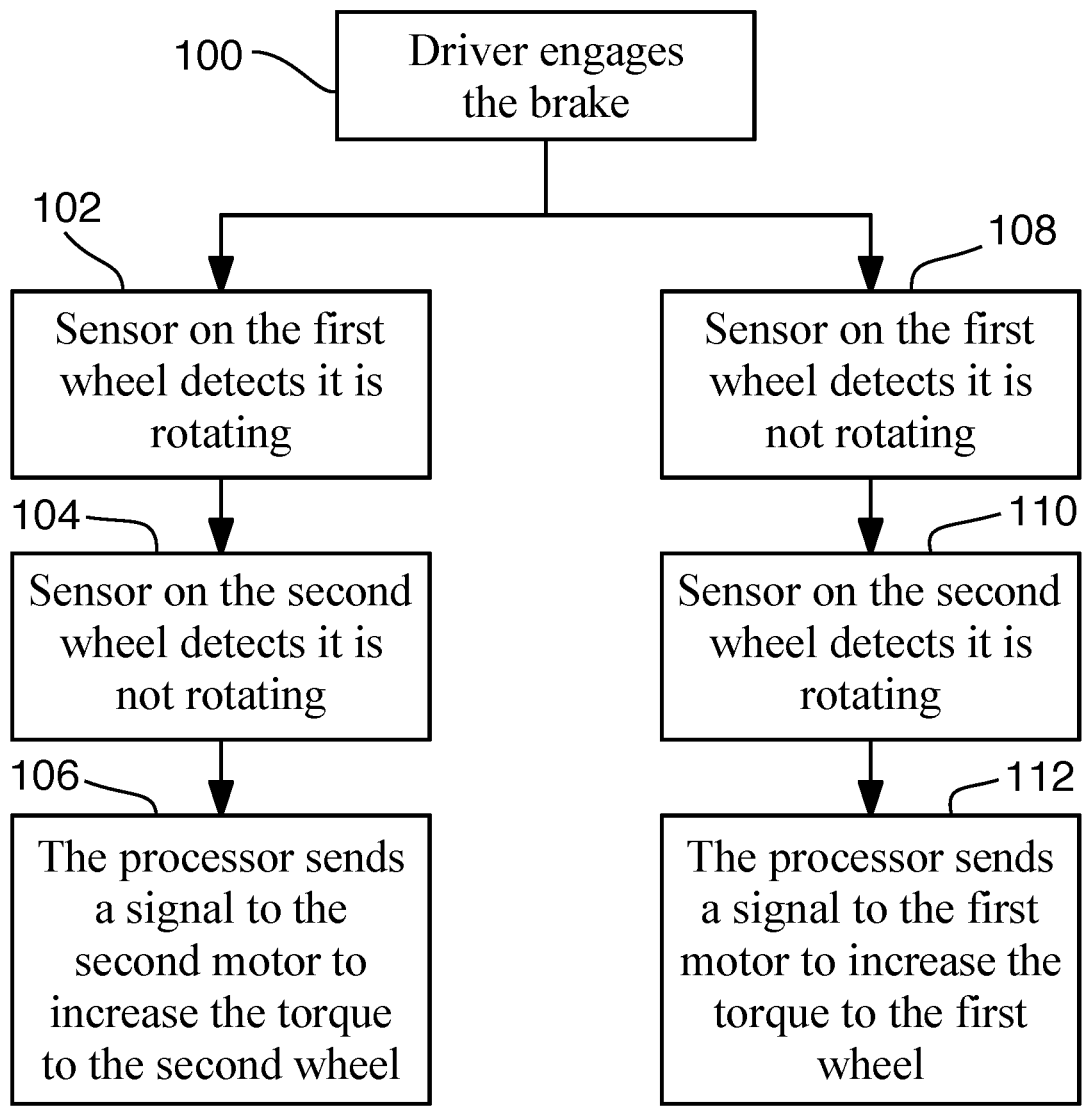
FIG. 4 is a flowchart of an antilock brake system on a vehicle with at least two wheels.

FIG. 4 shows a flowchart of a vehicle with at least two wheels. The driver activates the brake 100. If the sensor on the first wheel detects that it is rotating 102 and the sensor on the second wheel detects that it is not rotating 104 the processor sends a signal to the second electric motor to increase the torque to the second wheel 106. If the sensor on the first wheel detects that it is not rotating 108 and the sensor on the second wheel detects that it is rotating 110 the processor sends a signal to the first electric motor to increase the torque to the first wheel 112.

Figure 5:
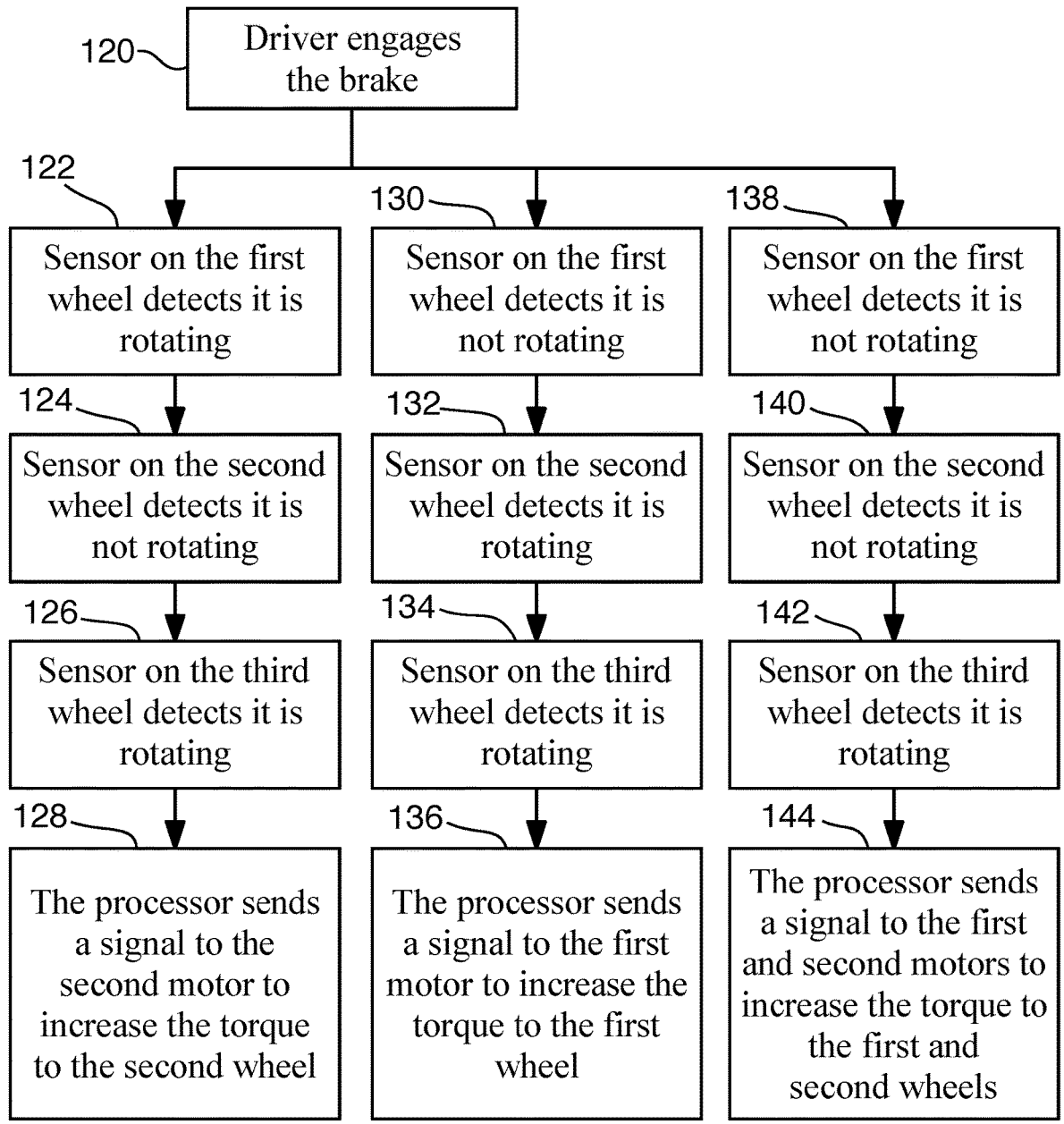
FIG. 5 is a flowchart of an antilock brake system on a vehicle with at least three wheels.

FIG. 5 shows a flowchart of a vehicle with at least three wheels. The driver activates the brake 120. If the sensor on the first wheel detects that it is rotating 122 and the sensor on the second wheel detects that it is not rotating 124 and the sensor on the third wheel detects that the third wheel is rotating 126 the processor sends a signal to the second electric motor to increase the torque to the second wheel 128. If the sensor on the first wheel detects that it is not rotating 130 and the sensor on the second wheel detects that it is rotating 132 and the sensor on the third wheel detects that it is rotating 134 the processor sends a signal to the first electric motor to increase the torque to the first wheel 136. If the sensor on the first wheel detects that the first wheel is not rotating 138 and the sensor on the second wheel detects it is not rotating 140 and the sensor on the third wheel detects that it is rotating 142 the processor sends a signal to the first and second electric motors to increase torque to the first and second wheels 144.

The invention has been described with reference to various specific and preferred embodiments and techniques. Nevertheless, it is understood that many variations and modifications may be made while remaining within the spirit and scope of the invention.

What is claimed is:

1. An electric vehicle with an antilock braking system comprising:
   a first wheel on a first side of the vehicle, driven by a first motor;
   a first brake for slowing and stopping rotation of the first wheel;
   a second wheel on a second, opposite side of the vehicle, driven by a second motor;
   a second brake for slowing and stopping rotation of the second wheel;
   a first sensor adapted to detect rotational speed of the first wheel;
   a second sensor adapted to detect rotational speed of the second wheel; and
   a processor in communication with the first and second sensor and, when the first and second brakes are applied, the processor is adapted to
   increase torque delivered to the first wheel from the first motor when the first sensor detects the first wheel has stopped rotating while the second wheel is still rotating; and
   increase torque delivered to the second wheel from the second motor when the second sensor detects the second wheel has stopped rotating while the first wheel is still rotating.

2. The invention of claim 1 wherein the processor is adapted to
   send a signal to the first motor to increase the torque delivered to the first wheel until the first wheel reaches a rotational speed that is a predetermined percentage of the rotational speed of the second wheel; and
   send a signal to the second motor to increase the torque delivered to the second wheel until the second wheel reaches a rotational speed that is a predetermined percentage of the rotational speed of the first wheel.

3. The invention of claim 1 wherein the processor is adapted to send a signal to the first motor to increase the torque delivered to the first wheel until the first wheel reaches the rotational speed of the second wheel; and
   send a signal to the second motor to increase the torque delivered to the second wheel until the second wheel reaches the rotational speed of the first wheel.

4. The invention of claim 1 wherein the processor is adapted to send a signal to the first motor to increase the torque delivered to the first wheel until the first wheel reaches a predetermined rotational speed; and send a signal to the second motor to increase the torque delivered to the second wheel until the second wheel reaches a predetermined rotational speed.

5. The invention of claim 1 wherein the first and second brakes are disc brakes.

6. The invention of claim 1 wherein the first and second sensors are Hall effect sensors.

7. The invention of claim 1 wherein the first and second sensors are optical sensors.

8. The invention of claim 1 wherein the first and second wheels and the first and second motors are configured to generate power during braking.

9. The invention of claim 1 wherein the first and second wheels are front wheels and wherein the electrical vehicle further comprises a single rear wheel not driven by a motor and a rear brake for slowing and stopping the rear wheel.

10. The invention of claim 9 wherein the first, second and rear brakes are disc brakes.

11. An electrical vehicle with an antilock braking system comprising:
    a first front wheel on a first side of the vehicle, driven by a first motor;
    a first brake for slowing and stopping the first front wheel;
    a first sensor adapted to detect rotational speed of the first wheel,
    a second front wheel on a second, opposite side of the vehicle, driven by a second motor;
    a second brake for slowing or stopping the second front wheel;
    a second sensor adapted to detect rotational speed of the second wheel, a rear wheel;
    a rear brake for slowing and stopping the rear wheel;
    a third sensor adapted to detect rotational speed of the rear wheel; and
    a processor in communication with the first, second and third sensors and, when the first and second brakes are applied, the processor is adapted to
    increase torque delivered to the first wheel from the first motor when the first sensor detects the first wheel has stopped rotating while the rear wheel is still rotating; and
    increase torque delivered to the second wheel from the second motor when the second sensor detects the second wheel has stopped rotating while the rear wheel is still rotating.

12. The invention of claim 11 wherein the electrical vehicle has only one rear wheel.

13. The invention of claim 11 wherein the rear wheel is not driven by a motor.

14. The invention of claim 11 wherein the processor is adapted to
    send a signal to the first motor to increase the torque delivered to the first wheel until the first wheel reaches a rotational speed that is a predetermined percentage of the rotational speed of the rear wheel; and
    send a signal to the second motor to increase the torque delivered to the second wheel until the second wheel reaches a rotational speed that is a predetermined percentage of the rotational speed of the rear wheel.

15. The invention of claim 11 wherein the processor is adapted to
send a signal to the first motor to increase the torque delivered to the first wheel until the first wheel reaches the rotational speed of the rear wheel; and
send a signal to the second motor to increase the torque delivered to the second wheel until the second wheel reaches the rotational speed of the rear wheel.

16. The invention of claim 11 wherein the processor is adapted to
send a signal to the first motor to increase the torque delivered to the first wheel until the first wheel reaches a predetermined rotational speed; and
send a signal to the second motor to increase the torque delivered to the second wheel until the second wheel reaches a predetermined rotational speed.

17. The invention of claim 11 wherein the brake on the third wheel is of lesser power than the brakes on the first and second wheels.

18. The invention of claim 11 wherein the first, second and rear brakes are disc brakes.

19. The invention of claim 11 wherein the first and second sensors are Hall effect sensors.

20. The invention of claim 11 wherein the first and second wheels and the first and second motors are configured to generate power during braking.

\* \* \* \* \*